US007519050B2

(12) United States Patent
Thalanany et al.

(10) Patent No.: US 7,519,050 B2
(45) Date of Patent: Apr. 14, 2009

(54) SYSTEM AND METHOD FOR INVOKING APPLICATIONS BASED ON A LOCATION OF A MOBILE STATION

(75) Inventors: Sebastian Thalanany, Buffalo Grove, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 736 days.

(21) Appl. No.: 11/024,549

(22) Filed: Dec. 29, 2004

(65) Prior Publication Data
US 2006/0142024 A1    Jun. 29, 2006

(51) Int. Cl.
*H04L 12/66* (2006.01)
(52) U.S. Cl. ...................................... 370/352
(58) Field of Classification Search ................ 370/352; 455/456.1
See application file for complete search history.

(56) References Cited

U.S. PATENT DOCUMENTS

2002/0016173 A1* 2/2002 Hunzinger ............... 455/456
2005/0169249 A1* 8/2005 Shirota et al. ............ 370/352

OTHER PUBLICATIONS

3GPP2 TSG-S A11-IP NAM, "IP Network Architecture Model for cdma2000 Spread Spectrum System", *3GPP2 and its Organizational Partners*, Aug. 21, 2003, 52 pgs.
3GPP2 TSG-S A11-IP NAM, "IP Network Architecture Model for cdma2000 Spread Spectrum System", *3GPP2 and its Organizational Partners*, Oct. 19, 2004, 55 pgs.
M. Garcia-Martin et al, Network Marking Group, "Private Header (P-Header) Extensions to the Session Initiation Protocol (SIP) for the $3^{rd}$-Generation Partnership Project (3GPP)", *The Internet Society (2003)*, Jan. 2003, 34 pgs.
J. Rosenberg et al, Network Working Group, "SIP: Session Initiation Protocol", *The Internet Society (2002)*, Jun. 2002, 268 pgs.

* cited by examiner

*Primary Examiner*—Alexander Eisen
*Assistant Examiner*—Wayne Cai
(74) *Attorney, Agent, or Firm*—Leydig, Voit & Mayer, Ltd.

(57) ABSTRACT

The present invention reduces latencies in a wireless network while decreasing bandwidth usage in the wireless network for mobile stations. The wireless network monitors the current access network identifier for a mobile station. Upon detecting a change in current access network identifier due to movement of the mobile station, the wireless network generates and transmits one or more messages containing the changed current access network identifier. The messages are subsequently processed and a portion of the wireless system registrar database corresponding to the mobile station is updated to reflect the change in current access network identifier. Based upon the change in the location of the mobile station, the wireless network invokes or ends corresponding location-based options.

18 Claims, 3 Drawing Sheets

SYSTEM AND METHOD FOR INVOKING APPLICATIONS BASED ON A LOCATION OF A MOBILE STATION

FIELD OF THE INVENTION

The present invention relates generally to communication systems, and more particularly, to a system and method for tracking a mobile station and invoking applications and user preferences based on the current location of the mobile station.

BACKGROUND OF THE INVENTION

Conventional wide area wireless networks using Internet Protocol (IP) include several potential latency points. Upon a first mobile station (MS) initiating a call to a second MS, the network must poll the second MS to determine its location. This polling process not only takes time, but also consumes valuable bandwidth resources. Once the call has been established, in-session latencies can occur when the first and/or second MS changes from one access network to another access network due to movement of the first and/or second MS.

Furthermore, a location-based application may fail to be invoked because the location of the MS is unknown. In addition, in some locations, multiple access networks may be available, for example a location may have both cdma2000 and Wi-Fi (IEEE 802.11 standard) wireless access available. While a user may have a preference as to the type of access network used, an application may not apply the user preference because it does not know the location of the MS. Alternatively, a location-based application may periodically poll the MS to determine its location. When the location-based application polls the MS and the MS has not moved, this leads to an inefficient use of the network's bandwidth resources. This is especially true when an access layer element within the network, such as a base station or packet control function, already has the location of the MS or the location of the MS has not changed.

Accordingly, there is a need for a system and method for tracking a location of an MS to reduce both system latency and bandwidth usage. Further, there is a need for timely invoking location-based applications that depend upon the location of the MS. Additionally, there is a need for properly implementing user preferences that may similarly depend upon the location of the MS.

SUMMARY OF THE INVENTION

A first embodiment of the invention is based upon a method for tracking a location of an MS based upon the identifier of the access network currently providing access for the MS. By detecting changes in the Access Network Identifier (ANID), the location of the MS can be tracked and a corresponding registrar database within the network can be updated. By detecting a change in the ANID at the access layer within a network, bandwidth at the application layer within the network is used only when the ANID actually changes. Thus, bandwidth at the application layer is conserved by not periodically polling an MS to determine if the MS has moved because the access layer already has this information. Updating the location of the MS stored in the registrar database therefore becomes an event-based function, not a periodic time-based function, thereby conserving application layer network bandwidth. Access layer bandwidth is also conserved as Radio Frequency (RF) bandwidth between a base station and various mobile stations will not be used for polling purposes that are initiated by the application layer.

In a related embodiment, the method further comprises invoking location-based applications corresponding to the location of the MS. The method also comprises invoking corresponding location-based user preferences. Location-based options correspond to location-based applications and location-based user preferences.

A further embodiment is a system for tracking a location of an MS based upon the ANID of the access network currently providing access for the MS. By detecting changes in the ANID, the network tracks the location of the MS and updates a corresponding registrar database. The system may invoke location-based options corresponding to the location of the MS.

Another embodiment is a computer product for operating on one or more computers for tracking a location of an MS. The computer product causes the computer(s) to detect a change in the ANID and to update a corresponding registrar database based upon a change in MS location. The computer product can cause the computer(s) to invoke location-based options corresponding to the location of the MS.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION

Figure 1:
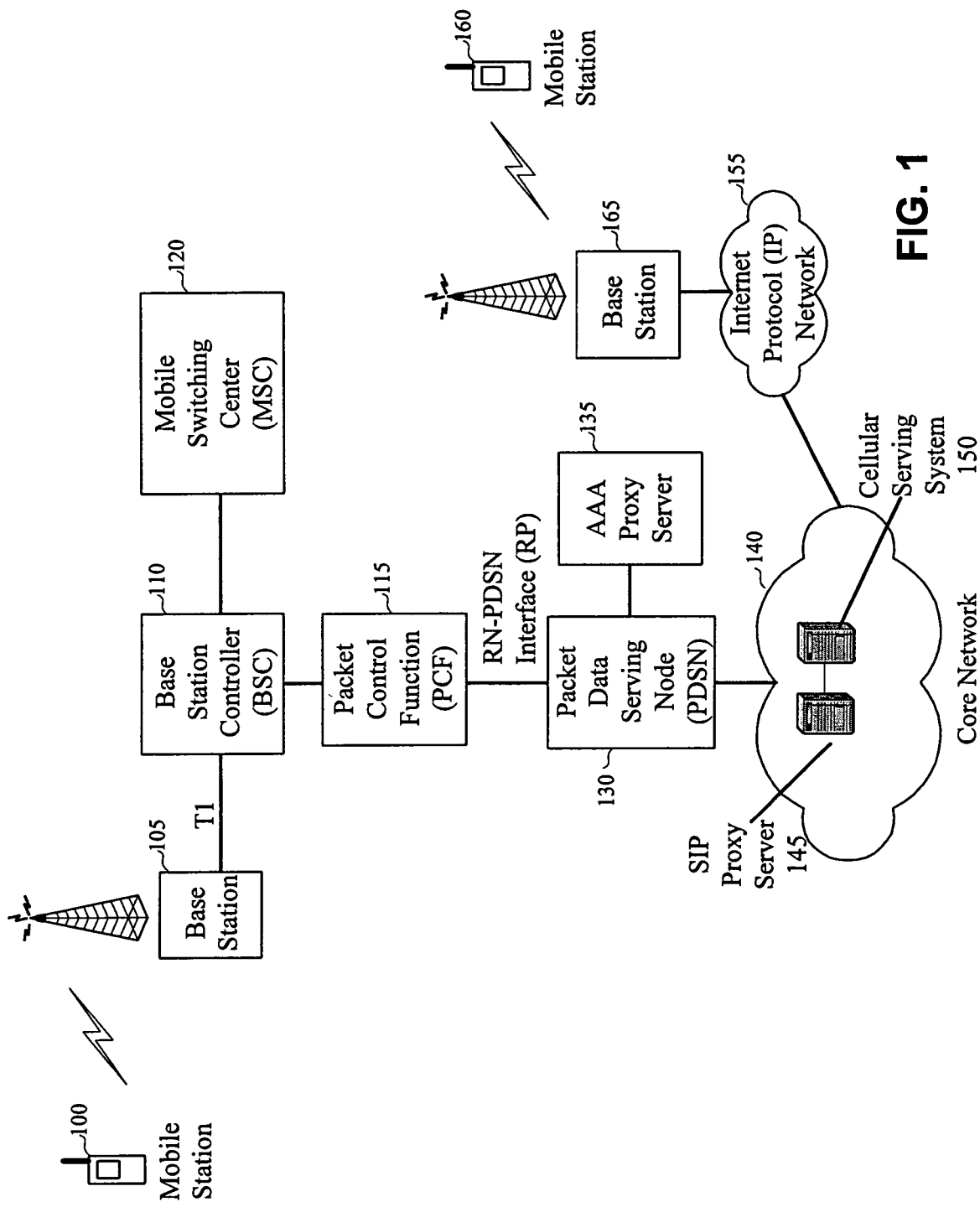
FIG. 1 is a schematic illustration of a cellular network in accordance with the present invention.

FIG. 1 schematically illustrates a representative environment of the present invention. An MS 100 (e.g., a cellular mobile telephone) wirelessly connects to a base station 105 via a radio frequency (RF) network (e.g., a cdma2000 network). The base station 105 connects to a base station controller (BSC) 110, typically via a wire-line, such as a T1 line. The BSC 110 connects to and controls multiple base stations 105. The BSC 110 connects to a Packet Control Function (PCF) 115 and to a Mobile Switching Center (MSC) 120.

The PCF 115 connects to a packet data serving node (PDSN) 130 via an RN-PDSN interface (RP). The Radio Network (RN) includes the PCF 115, the BSC 110, and the base station 105. The PDSN 130 connects to an Authentication, Authorizing, and Accounting (AAA) proxy server 135 and to a core network 140, both typically via wire-line. The core network 140 includes both a Session Initiation Protocol (SIP) proxy server 145 and a Cellular Serving System (CSS) 150, also typically connected via a wire-line. The core network 140 connects to a communications network 155 (e.g., the Internet). For purposes of this patent, an access layer element within the wireless network corresponds to any element below the core network 140, including, but not limited to, the MS 100, the base station 105, the BSC 110, the PCF 115, the MSC 120, the PDSN 130, and the AAA proxy server 135. Furthermore, an application layer element within the wireless network includes, but is not limited to, the core network 140 itself, the SIP proxy server 145, the CSS 150, and the communications network 155. Thus, the protocol stack distinguishes access layer elements from application layer elements.

A second MS 160 (e.g., a cellular mobile phone) wirelessly connects to a second base station 165 via a second RF network. In the illustrated embodiment, the second RF network is not necessarily a cdma2000 network, but can use another type of wireless access technology. The second base station 165 connects to the communications network 155 via a number of intermediate devices (not shown) to allow the second MS 160 to communicate with the MS 100. The present invention can be used to advantage in a wide area wireless network using Internet Protocol (IP) for communication between core networks. The present invention also applies to various wireless communication networks including, but not limited to, Wi-Fi, wireless local area networks (LAN), Wideband Code Division Multiple Access (WCDMA) networks, General Packet Radio Services (GPRS), and Third Generation (3G) networks.

Figure 2:
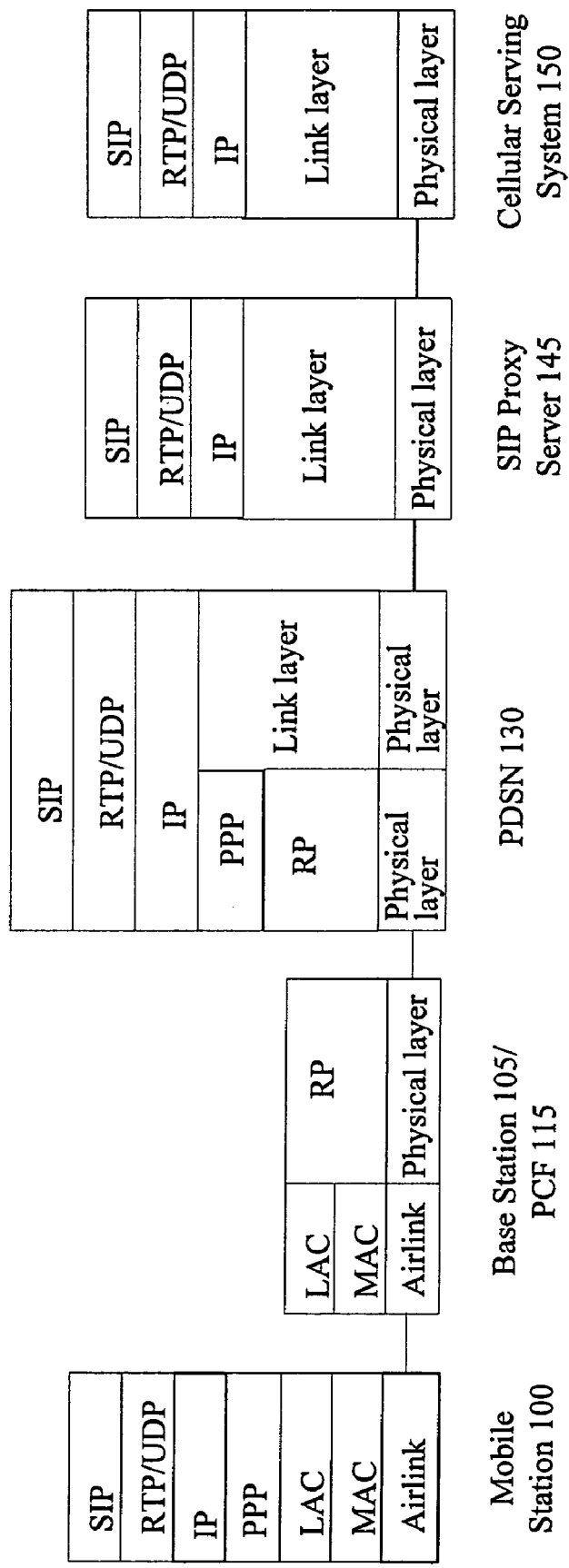
FIG. 2 is a block diagram illustrating a protocol reference model for a cellular network in accordance with the present invention.

FIG. 2 illustrates a protocol reference model for a cdma2000 based access network in accordance with the present invention. The physical layer and link layer protocols would be different for other wireless access technologies. For interoperability, the protocols at the network layer and above use open standards. In this protocol model, call control is performed via the Session Initiation Protocol (SIP), and the media streams are conveyed over the Real Time Protocol (RTP), User Datagram Protocol (UDP), and Internet Protocol (IP).

The protocol stack for the MS 100, the base station 105/PCF 115, the PDSN 130, the SIP proxy server 145, and the CSS 150 are shown in FIG. 2. At the top of the protocol stack is the SIP, which provides for call control between the MS 100, the PDSN 130, and the CSS 150. The data streams are then conveyed between the MS 100, the PDSN 130, and the CSS 150 via RTP/UDP/IP. A Radio Access Network (RAN) protocol is used for transmitting data from base stations 105 to the BSC 110, between BSCs (not shown), and between the BSC 110 and an associated MSC 120.

At the link layer, the MS 100 communicates with the PDSN 130 via the point-to-point protocol (PPP), and with the base station 105/PCF 115 via the link access control (LAC) and the medium access control (MAC) protocols. At the physical layer, the MS 100 communicates with the base station 105 via an air-interface using the Airlink protocol.

The base station 105/PCF 115 communicates with the PDSN 130 via radio protocol (RP) at the link layer, and via any number of protocols at the physical layer depending on the physical interconnections between the base station 105/PCF 115 and the PDSN 130.

The PDSN 130 communicates with the SIP proxy server 145 via the same protocol stack of SIP/RTP/UDP/IP as the MS 100. As the physical interconnections between the PDSN 130 and the SIP proxy server 145 are system dependent, the corresponding link layer protocols will also be system dependent. The PDSN 130 can also communicate with the AAA proxy server 135 associated with the MS 100. The PDSN 130 then forwards data from the AAA proxy server 135 along with data from the base station 105/PCF 115 to the SIP proxy server 145. By employing various open protocols, communications between the MS 100 and the CSS 150 may be carried out independent of the number and types of physical interconnections therebetween.

The relevant data to be passed through the networks illustrated in FIGS. 1 and 2 will now be discussed. The ANID identifies the access network to which the MS 100 attaches, and consists of at least a Packet Zone Identifier (PZID), a System Identifier (SID), and a Network Identifier (NID). Thus, the ANID defines the packet zone or serving location of the PCF 115, and therefore the location of the MS 100. The ANID to which the MS 100 is currently attached is the Current ANID (CANID). The ANID to which the MS 100 was previously attached is the Previous ANID (PANID). The MS 100 transmits the ANID (which includes both the PANID and the CANID) to the base station 105 via the air-interface and from there to the PCF 115. The MS 100, upon detecting a change in PZID, temporarily opens a communication channel and transmits the ANID to the base station 105. In other words, the MS 100 initiates the data transmission process based on the occurrence of an event, a change in PZID, not merely the passage of time. The PCF 115 subsequently forwards the ANID to the PDSN 130. The PDSN compares the PANID and the CANID to determine if there has been a change in access network. A change in access network indicates a change in the location of the MS 100. Note that while the PZID, the SID, and the NID define the ANID under the cdma2000 protocol, other wireless network protocols can employ other data components within an access network identifier. Because the present invention is applicable to other wireless network protocols, the term access network identifier or ANID includes any identifier that indicates the access network to which an MS 100 is attached.

Upon detecting a change in access networks, the PDSN 130 generates a current access network bearer trigger message that is transmitted to the SIP proxy server 145. This current access network bearer trigger message includes the CANID for the access network to which the MS 100 is currently attached. While bearer trigger messages are part of the cdma2000 protocol, other wireless network protocols include messages serving the same function of transmitting operational data within the wireless network. Therefore, a bearer trigger message will correspond more generally to a message specified by a wireless network protocol and used for transmitting operational data within the wireless network.

The PDSN 130 requests data corresponding to location-based options from the AAA proxy server 135. These location-based options can include presence status information and service subscription choices. These service subscription choices can include alerts based on weather or traffic issues and other multi-media services that may be integrated with cellular service. The service subscription choices can also include location-based service options, such as a connection access option in which Wi-Fi access is given preference over cdma2000 access when both are available in a given location. When data corresponding to location-based options is available, the current access network bearer trigger message generated by the PDSN 130 can include the location-based options as well as the CANID.

Upon receiving the current access network bearer trigger message, the SIP proxy server 145 generates a corresponding current access network SIP register message that is transmitted to the CSS 150. The current access network SIP register message includes a P-Access-Network-Info field. The P-Access-Network-Info includes both the CANID and any location-based options from the current access network bearer trigger message. Upon receiving the current access network SIP register message, the CSS 150 updates a portion of a registrar database contained therein with the CANID and any location-based options contained in the current access network SIP register message. While the registrar database is contained within the CSS 150 in this example, the registrar database can be located anywhere within the wireless network so long as the CSS 150 can update it. Furthermore, the registrar database can be any database a wireless service provider employs to track the status of an MS 100. After updating the registrar database, the CSS 150 then causes any relevant location-based options to be invoked. When the relevant location-based options to be invoked are located on the CSS 150, the CSS 150 simply starts the location-based option. Some relevant location-based options can be located on the MS 100, the base station 105, the PCF 115, the PDSN 130, the CSS 150, or some combination thereof. In these cases, the CSS 150 invokes the location-based option by sending one or more messages to cause the corresponding element(s) to start the location-based option.

Figure 3:
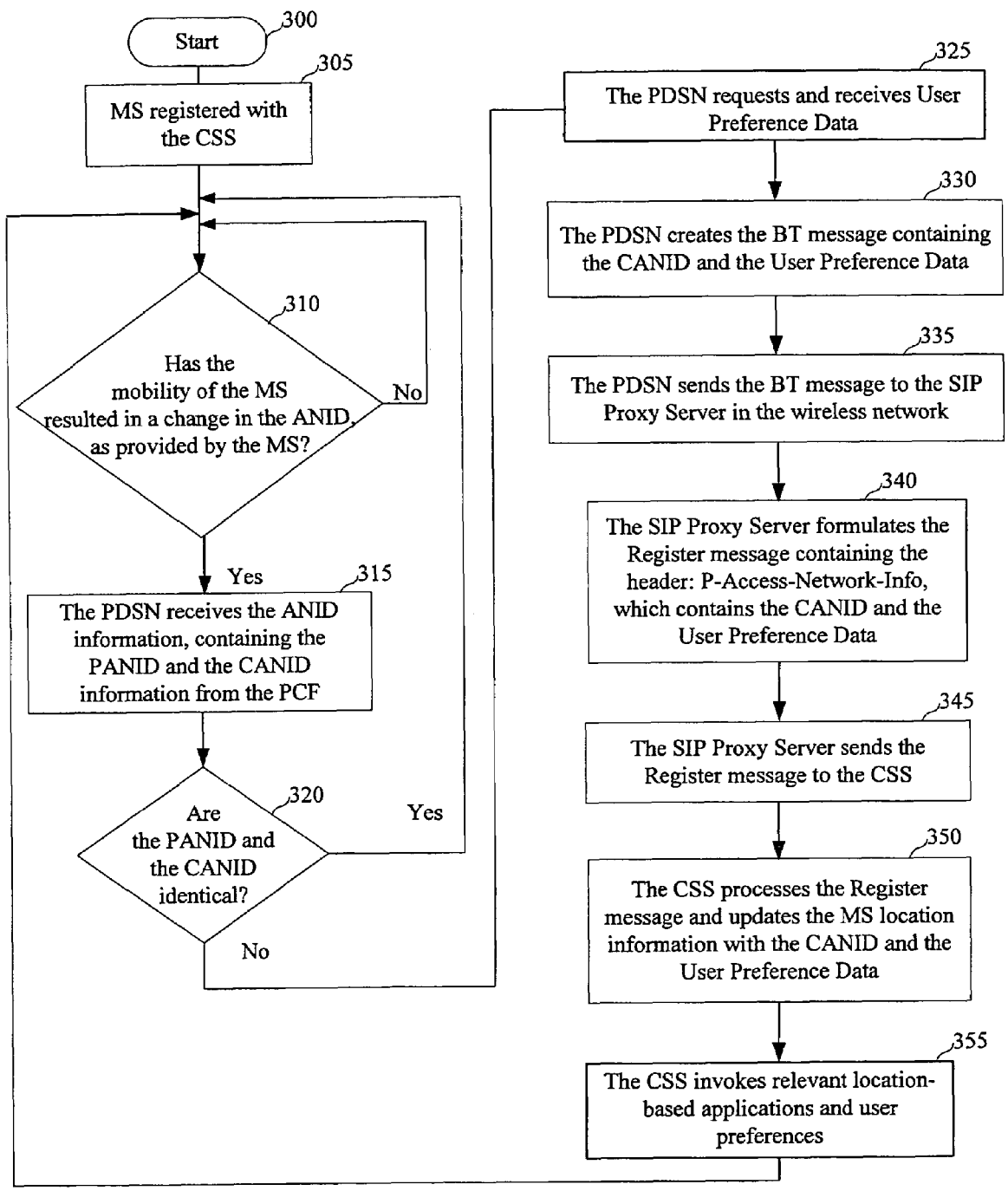
FIG. 3 is a flow diagram illustrating a method for tracking a location of a MS in accordance with the present invention.

FIG. 3 illustrates a flow diagram of a process for MS tracking in accordance with the present invention. The process tracks the CANID and revises a registrar database located in a memory (not shown) within the CSS 150 when changes in the CANID are detected. The process may invoke location-based options based upon the CANID.

The process starts at step 300. In step 305, the CSS 150 registers the MS 100 upon the MS 100 being powered-up. In step 310, the PCF 115 determines if the ANID provided by the MS 100 has changed due to a change in the location of the MS 100. If there has been no change in the ANID, the PCF 115 continues to monitor messages from the MS 100 for possible changes in the ANID. If the PCF 115 detects a change in the ANID, the PCF 115 transmits the ANID, containing both the PANID and the CANID, to the PDSN 130 in step 315. In step 320, the PDSN 130 compares the PANID and the CANID to determine if they are identical. If the PANID and the CANID are identical, which would occur upon powering-up the MS 100, then the process returns, and the PCF 115 continues to monitor messages from the MS 100 for possible changes in the ANID.

If the PDSN 130 determines the PANID and the CANID are not identical in step 320, this indicates the MS 100 has changed locations and further steps are taken. In step 325, the PDSN 130 requests and receives data corresponding to location-based options from the AAA proxy server 135. In step 330, the PDSN 130 generates a current access network bearer trigger message containing the CANID and the location-based options. The PDSN transmits this current access network bearer trigger message to the SIP proxy server 145 in step 335. In other words, the access layer transmits the CANID to the application layer of the wireless network. The SIP proxy server 145, in step 340, generates a current access network SIP register message with a P-Access-Network-Info field containing the CANID and the location-based options. The SIP proxy server 145 transmits the current access network SIP register message to the CSS 150 in step 345. The CSS 150, upon receipt of the current access network SIP register message in step 350, revises the CANID and the location-based options portion of the registrar database associated with the MS 100. In step 355, the CSS 150 invokes any required changes corresponding to location-based options based upon the location of the MS 100 as reflected in the revised CANID. Such changes could include invoking any relevant location-based options. The entire process then repeats until the next change in CANID is detected.

While the above describes the process whereby a location-based option is invoked, the invention contemplates the reverse as well. When an MS 100 changes location such that a given location-based option no longer applies, the CSS 150 will end the location-based option. As before, this may be at the CSS 150 level if the location-based option is on the CSS 150. If the location-based option resides on one or more of the other elements in the wireless network, the CSS 150 will send the appropriate end massage(s) to the corresponding element(s).

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method for tracking a mobile station, the method comprising:
   receiving, by a first access layer element of a wireless network, a current access network identifier from the mobile station, the current access network identifier based at least in part on a packet zone serving the mobile station;
   comparing the current access network identifier with a previous access network identifier;
   generating a current access network message including the current access network identifier when the current access network identifier is different from the previous access network identifier;
   requesting, by the first access layer element, a list comprising one or more location based options corresponding to the current access network identifier from a second access layer element;
   storing, by the first access layer element, the list including the location based options in the current access network message;
   transmitting the current access network message from the first access layer element to an application layer element of the wireless network, the application layer element adapted to cause the one or more location based options corresponding to the current access network identifier to be invoked; and
   updating a current access network identifier portion of a registrar database in the application layer element based upon the current access network message.

2. A method in accordance with claim 1, wherein the invoked location-based option resides on at least one of an access layer element and an application layer element.

3. A method in accordance with claim 1, wherein the list including location-based options includes one or more options selected from the group consisting of a weather alert application, a traffic alert application, a connection access option, and a multi-media service.

4. A method in accordance with claim 1, the method further comprising ending a location-based option that does not correspond to the current access network identifier.

5. A method, performed by a computer associated with a packet data serving node, for tracking a mobile station, the method comprising:
   receiving, at the computer, a current access network identifier from the mobile station, the current access network identifier based at least in part on a packet zone serving the mobile station;
   comparing the current access network identifier with a previous access network identifier;
   generating a current access network bearer trigger message including the current access network identifier when the current access network identifier is different from the previous access network identifier;

requesting a list comprising one or more location based options corresponding to the current access network identifier;

receiving and storing the list comprising the location based options in the current access network bearer trigger message; and transmitting the current access network bearer trigger message from the packet data serving node to a cellular serving system, the cellular serving system adapted to update a current access network identifier portion of a registrar database based upon the current access network bearer trigger message and to cause the one or more location based options corresponding to the current access network identifier to be invoked.

6. A method in accordance with claim 5, wherein the list including location-based options is received from an authentication, authorizing, and accounting proxy server.

7. A method in accordance with claim 5, wherein the list including location-based options includes one or more options selected from the group consisting of a weather alert application, a traffic alert application, a connection access option, and a multi-media service.

8. A packet data serving node for tracking a mobile station, the packet data serving node comprising:
    a receiver for receiving a current access network identifier from the mobile station, the current access network identifier based at least in part on a packet zone serving the mobile station;
    a processor for comparing the current access network identifier with a previous access network identifier;
    a message generator for requesting a list comprising one or more location based options corresponding to the current access network identifier and generating a current access network bearer trigger message including the current access network identifier and the list when the current access network identifier is different from the previous access network identifier; and
    a transmitter for transmitting the current access network bearer trigger message to a cellular serving system, the cellular serving system adapted to cause the one or more location based options corresponding to the current access network identifier to be invoked and to update a current access network identifier portion of a registrar database based upon the current access network bearer trigger message.

9. A packet data serving node in accordance with claim 8, wherein the receiver is adapted to receive the list including location-based options from an authentication, authorizing, and accounting proxy server.

10. A packet data serving node in accordance with claim 8, wherein the list including location-based options includes one or more options selected from the group consisting of a weather alert application, a traffic alert application, a connection access option, and a multi-media service.

11. A wireless network for tracking a mobile station, the wireless network comprising:
    a first receiver for receiving a current access network identifier from the mobile station, the current access network identifier based at least in part on a packet zone serving the mobile station;
    a first processor for comparing the current access network identifier with a previous access network identifier;
    a message generator for requesting a list comprising one or more location based options corresponding to the current access network identifier and generating a current access network message including the current access network identifier and the list when the current access network identifier is different from the previous access network identifier;
    a first transmitter for transmitting the current access network message from a packet data serving node to a cellular serving system, the cellular serving system adapted to cause the one or more location based options corresponding to the current access network identifier to be invoked;
    a second receiver for receiving the current access network message; and
    a second processor for updating a current access network identifier portion of a registrar database based upon the current access network message.

12. A wireless network in accordance with claim 11, wherein the one or more invoked location-based options reside on at least one element selected from the group consisting of the mobile station, a base station, a packet control function, the packet data serving node, and the cellular serving system.

13. A wireless network in accordance with claim 11, wherein the list including location-based options is received from an authentication, authorizing, and accounting proxy server.

14. A wireless network in accordance with claim 11, wherein the list including location-based options includes one or more options selected from the group consisting of a weather alert application, a traffic alert application, a connection access option, and a multi-media service.

15. A wireless network in accordance with claim 11, wherein the second processor is adapted to end a location-based option that does not correspond to the current access network identifier.

16. A computer readable medium encoded with instructions capable of being executed by a computer associated with a packet data serving node, for tracking a mobile station, the instructions comprising:
    receiving a current access network identifier from the mobile station, the current access network identifier based at least in part on a packet zone serving the mobile station;
    comparing the current access network identifier with a previous access network identifier;
    generating a current access network bearer trigger message including the current access network identifier when the current access network identifier is different from the previous access network identifier;
    requesting a list comprising one or more location based options corresponding to the current access network identifier;
    receiving and storing the list comprising the location based options in the current access network bearer trigger message; and
    transmitting the current access network bearer trigger message from the packet data serving node to a cellular serving system, the cellular serving system adapted to cause the one or more location based options corresponding to the current access network identifier to be invoked and to update a current access network identifier portion of a registrar database based upon the current access network bearer trigger message.

17. A computer readable medium in accordance with claim 16, wherein the list including location-based options is received from an authentication, authorizing, and accounting proxy server.

18. A computer readable medium in accordance with claim 16, wherein the list including location-based options includes one or more options selected from the list consisting of a weather alert application, a traffic alert application, a connection access option, and a multi-media service.

* * * * *